(12) United States Patent
Kobayashi

(10) Patent No.: US 11,735,140 B2
(45) Date of Patent: Aug. 22, 2023

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Shigeyuki Kobayashi, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/537,259

(22) Filed: Nov. 29, 2021

(65) Prior Publication Data

US 2022/0180840 A1 Jun. 9, 2022

(30) Foreign Application Priority Data

Dec. 3, 2020 (JP) ................... 2020-201218

(51) Int. Cl.
*G09G 5/10* (2006.01)
*G09G 5/02* (2006.01)
*G06T 19/00* (2011.01)

(52) U.S. Cl.
CPC ............ *G09G 5/10* (2013.01); *G06T 19/00* (2013.01); *G09G 5/02* (2013.01); *G09G 2320/103* (2013.01); *G09G 2320/106* (2013.01); *G09G 2360/147* (2013.01)

(58) Field of Classification Search
CPC ...... G09G 5/10; G09G 5/02; G09G 2320/103; G09G 2320/106; G09G 2360/147; G06T 19/00; G06T 7/20
See application file for complete search history.

(56) References Cited

U.S. PATENT DOCUMENTS

| | | | | |
|---|---|---|---|---|
| 10,898,804 | B2* | 1/2021 | Masuda | G06T 15/20 |
| 11,210,853 | B2* | 12/2021 | Suzuoki | G06T 15/20 |
| 11,250,581 | B2* | 2/2022 | Yoshimura | G06T 7/557 |
| 2019/0160377 | A1* | 5/2019 | Masuda | G08G 1/166 |

FOREIGN PATENT DOCUMENTS

JP 2019134271 A 8/2019

* cited by examiner

*Primary Examiner* — Vijay Shankar
(74) *Attorney, Agent, or Firm* — Canon U.S.A., Inc. IP Division

(57) ABSTRACT

An apparatus includes an acquisition unit configured to acquire a signal that indicates a position of a pixel where a change in luminance has occurred and a time when the change in luminance has occurred, a determination unit configured to determine, on a pixel-by-pixel basis, an evaluation value corresponding to a frequency at which a change in luminance in a predetermined direction has occurred, based on the signal, a generation unit configured to generate an image indicating a direction of the change in luminance at the position of the pixel where the change in luminance has occurred, and a control unit configured to control display of the generated image based on the evaluation value.

21 Claims, 9 Drawing Sheets

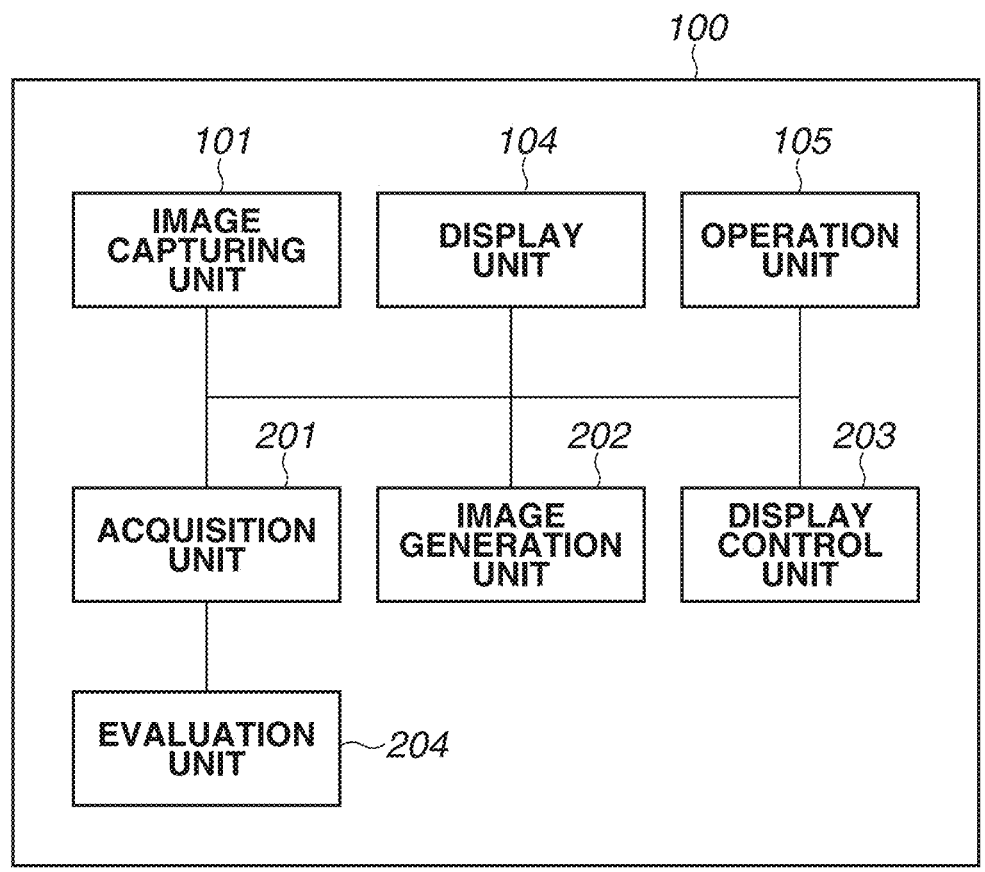

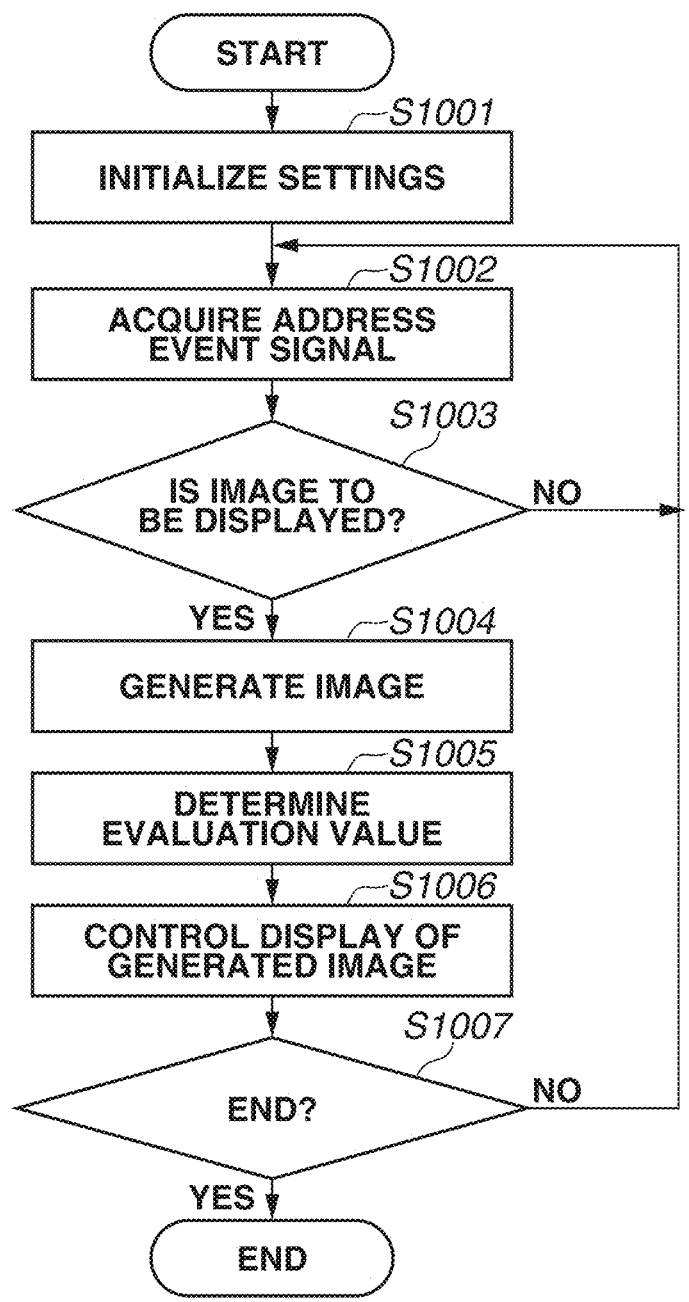

INFORMATION PROCESSING APPARATUS, INFORMATION PROCESSING METHOD, AND STORAGE MEDIUM

BACKGROUND OF THE DISCLOSURE

Field of the Disclosure

The aspect of the embodiments relates to display of an event-based sensor.

Description of the Related Art

There is known an event-based sensor that outputs a change in luminance of each pixel in real time as an address event signal, as discussed in Japanese Patent Application Laid-Open No. 2019-134271.

SUMMARY OF THE DISCLOSURE

According to an aspect of the embodiments, an apparatus includes an acquisition unit configured to acquire a signal that indicates a position of a pixel where a change in luminance has occurred and a time when the change in luminance has occurred, a determination unit configured to determine, on a pixel-by-pixel basis, an evaluation value corresponding to a frequency at which a change in luminance in a predetermined direction has occurred, based on the signal, a generation unit configured to generate an image indicating a direction of the change in luminance at the position of the pixel where the change in luminance has occurred, and a control unit configured to control display of the generated image based on the evaluation value.

Further features of the disclosure will become apparent from the following description of exemplary embodiments with reference to the attached drawings.

BRIEF DESCRIPTION OF THE DRAWINGS

FIG. 2 is a block diagram illustrating an example of a functional configuration of the information processing apparatus according to the first exemplary embodiment.

FIG. 9 is a flowchart illustrating processing performed by the information processing apparatus according to the first exemplary embodiment.

DESCRIPTION OF THE EMBODIMENTS

In an event-based sensor, a method (hereinafter referred to as an XY superimposed display) for superimposing and displaying newly detected luminance changes while retaining display of past luminance changes is used. The XY superimposed display enables particularly a periodic motion of a subject to be displayed in an easy-to-understand manner There may be cases where the event-based sensor is used to detect a low-frequency abnormality in a subject that moves periodically at a high speed, such as a machine used in the manufacturing industry. In such a use case where a user visually observes a moving image captured by the event-based sensor and detects occurrence of an abnormality, the user is likely to notice the abnormality because the display of past luminance changes indicating an abnormal operation remains. However, from a practical standpoint, it is difficult to distinguish loci of normal and abnormal operations from each other in a case where the difference between the normal and abnormal operations is small.

An information processing apparatus according to an exemplary embodiment of the disclosure can be used to address this issue and facilitate the detection of an abnormality in a subject in measurement processing using the event-based sensor. Hereinafter, the information processing apparatus according to an exemplary embodiment of the disclosure will be described with reference to the attached drawings. In all the drawings, components having the same function are given the same numerals and the repetitive descriptions thereof will be omitted.

<Information Processing Apparatus>

Figure 1:
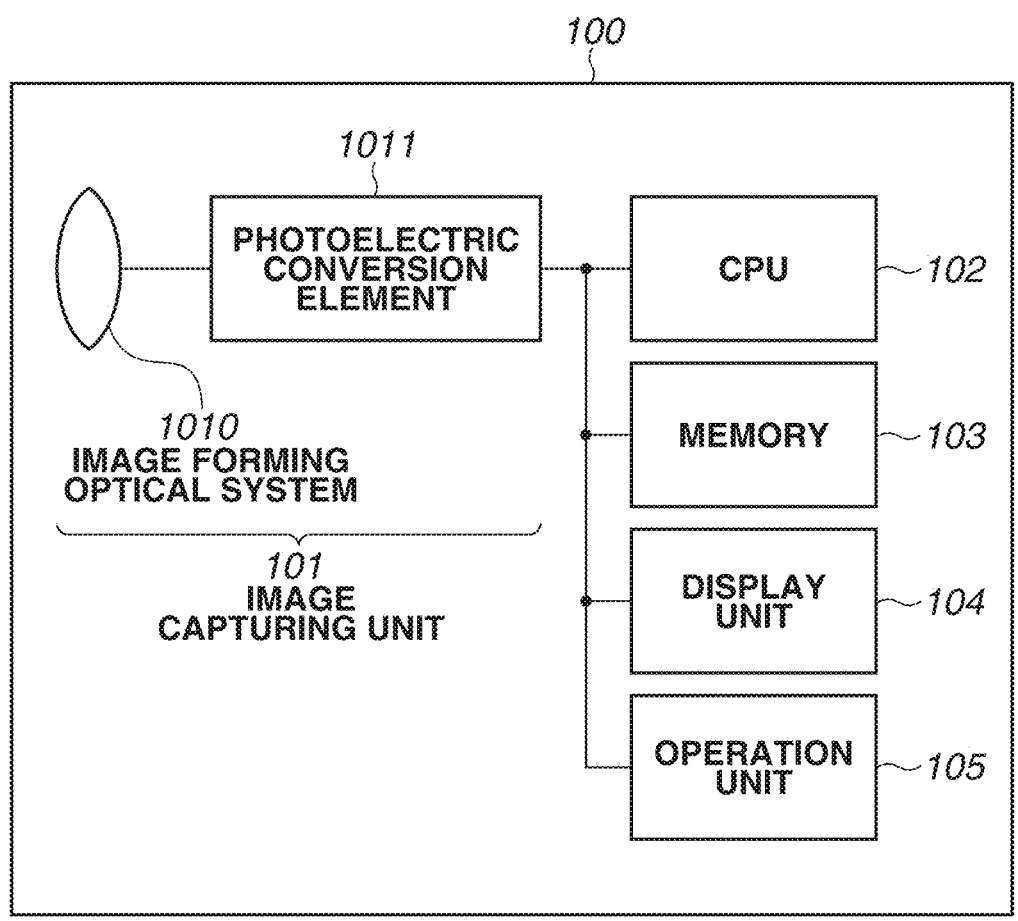
FIG. 1 is a block diagram illustrating an example of a hardware configuration of an information processing apparatus according to a first exemplary embodiment.

FIG. 1 is a block diagram illustrating an example of a hardware configuration of an information processing apparatus 100 according to a first exemplary embodiment of the disclosure. In FIG. 1, the information processing apparatus 100 includes an image capturing unit 101 including an image forming optical system 1010 and a photoelectric conversion element 1011, a central processing unit (CPU) 102, a memory 103, a display unit 104, and an operation unit 105. The image capturing unit 101 outputs an address event signal corresponding to received incident light. The image forming optical system 1010 is a light receiving lens that receives incident light and forms an image on the photoelectric conversion element 1011. The photoelectric conversion element 1011 is a single photon avalanche diode (SPAD) sensor or a complementary metal oxide semiconductor (CMOS) sensor, and outputs the address event signal corresponding to the received incident light. The CPU 102 reads and executes an operating system (OS) and other programs stored in the memory 103, controls the components connected to the CPU 102, and performs various processing calculations and logical determinations. The processing executed by the CPU 102 includes information processing according to the present exemplary embodiment. The CPU 102 also controls driving of a focus lens and an aperture of the image forming optical system 1010, driving of the photoelectric conversion element 1011, and the like. The memory 103 is, for example, a hard disk drive or an external storage device, and stores a program for the information processing according to the present exemplary embodiment and various kinds of data. The display unit 104 outputs a calculation result of the information processing apparatus 100 or the like to a display device based on an instruction from the CPU 102. The display device can be of any type such as a liquid crystal display device, a projector, or a light emitting diode (LED) indicator. The operation unit 105 is, for example, a touch panel, a keyboard, a mouse, or a robot controller, and is a user interface that receives an input instruction from a user.

Next, an example of a functional configuration of the information processing apparatus 100 according to the present exemplary embodiment will be described with reference to FIG. 2. The information processing apparatus 100 includes the image capturing unit 101, an acquisition unit 201, an image generation unit 202, a display control unit 203, an evaluation unit 204, the display unit 104, and the operation unit 105. An overview of each of the functions will be described now. The image capturing unit 101 outputs the address event signal corresponding to the received incident light. More specifically, the image capturing unit 101 outputs the address event signal that indicates the address of a pixel in which a change in luminance has occurred and the time when the change has occurred. The acquisition unit 201 acquires the address event signal that indicates the position of the pixel where the change in luminance has occurred and the time when the change has occurred.

Based on the address event signal, the image generation unit 202 generates an image in which a predetermined pixel value corresponding to a direction of the change in luminance is assigned to the position of the pixel where the change in luminance has occurred. The display control unit 203 causes the display unit 104 to display the generated image. The evaluation unit 204 determines, for each pixel, an evaluation value corresponding to a frequency at which a change in luminance in a predetermined direction has occurred. The display unit 104 displays the generated image. The operation unit 105 receives an input from the user. The display unit 104 and the operation unit 105 may be implemented by an external apparatus outside the information processing apparatus 100. Details of each of the functions will be described next.

<Event-Based Sensor>

An example of an event-based sensor according to the present exemplary embodiment will be described. The event-based sensor counts the number of incident photons, and makes a determination about the timing when the counted number of photons exceeds a predetermined threshold value. The event-based sensor also measures the time (the number of clocks) taken for the number of incident photons to reach or exceed a first threshold value, and detects a change in luminance by comparing the measured time with the previous one. More specifically, assuming that the previous measured time is $T_0$ and the latest measured time is T, if the difference $T-T_0$ is greater than or equal to a second threshold value, a change in luminance in a negative direction is detected. If the difference $T_0-T$ is greater than or equal to the second threshold value, a change in luminance in a positive direction is detected. If the difference between T and $T_0$ is less than the second threshold value, no luminance change is detected. The second threshold value is greater than or equal to zero, and a preset value or a value set based on other parameters is used as the second threshold value.

Figure 3A:
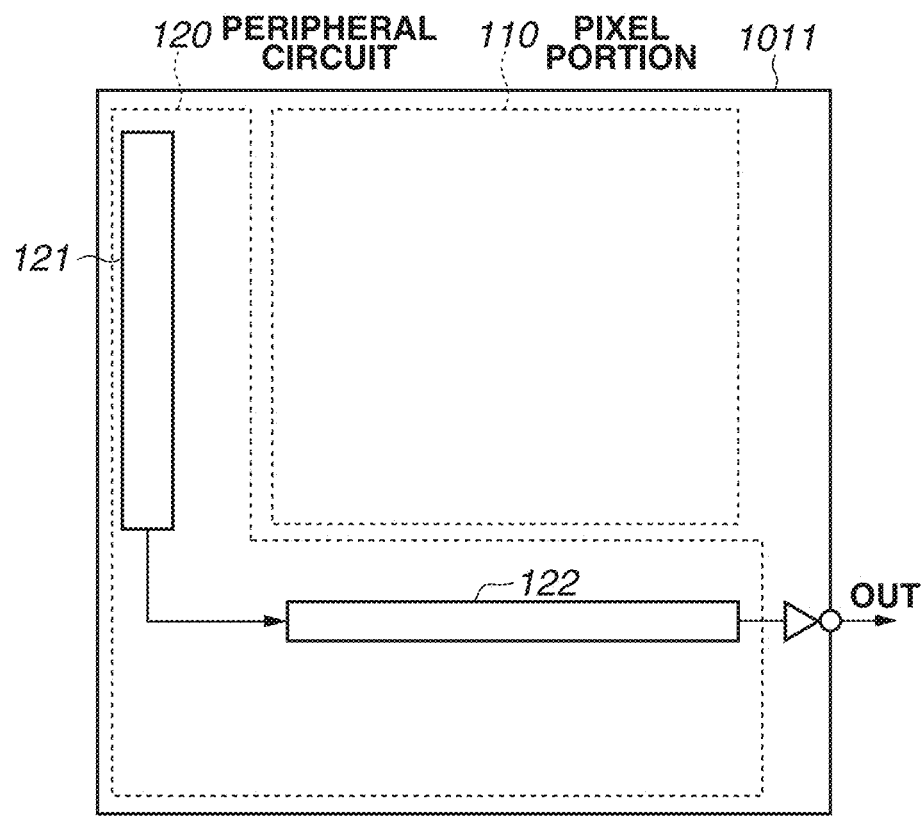
FIGS. 3A and 3B are diagrams each illustrating an example of a configuration of a photoelectric conversion element according to the first exemplary embodiment.

A detailed configuration of the event-based sensor will be described next. FIG. 3A illustrates an example of a configuration of the photoelectric conversion element 1011. The photoelectric conversion element 1011 includes a pixel portion 110 and a peripheral circuit 120. The peripheral circuit 120 includes a vertical arbitration circuit 121 and a horizontal readout circuit 122.

Figure 3B:
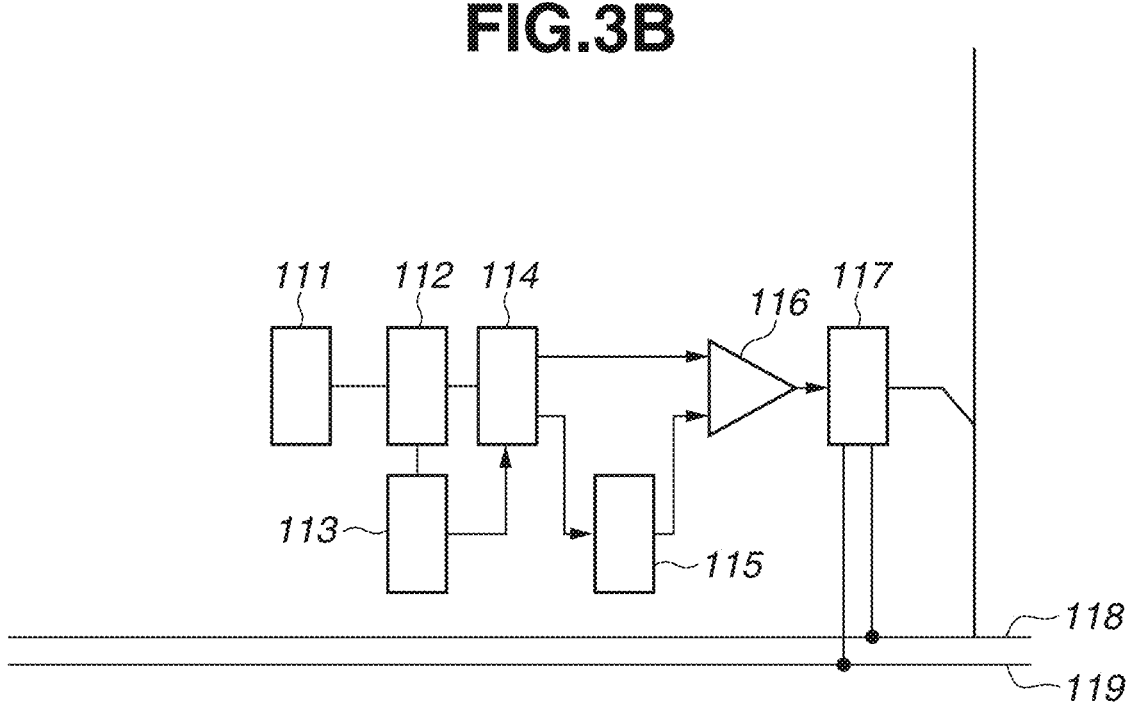

FIG. 3B illustrates an example of a configuration of the pixel portion 110 included in the event-based sensor. The pixel portion 110 includes a photoelectric conversion unit 111, a pixel counter 112, a time counter 113, a first determination circuit 114, a memory 115, a comparator 116, a second determination circuit 117, a response circuit 118, and a selection circuit 119. The photoelectric conversion unit 111 includes an SPAD that operates in Geiger mode, and the pixel counter 112 counts the number of photons incident on the photoelectric conversion unit 111. The time counter 113 counts the time when a photon is incident on the photoelectric conversion unit 111. By configuring the event-based sensor with the use of the SPAD, the luminance change at the level of a single photon can be detected. By detecting the luminance change at the level of a single photon, it is possible to acquire the address event signal even in nighttime or other night vision conditions.

When the number of photons counted by the pixel counter 112 reaches the first threshold value, the first determination circuit 114 stops the counting of the time by the time counter 113. The past count values of the time counter 113 are stored in the memory 115, and the comparator 116 is used to obtain the difference between the current count value of the time counter 113 and the past count value of the time counter 113.

The second determination circuit 117 transmits a request signal to the vertical arbitration circuit 121 via the response circuit 118 in a case where the difference between the count values is greater than or equal to the second threshold value. The response circuit 118 receives, from the vertical arbitration circuit 121, a response indicating permission or non-permission of output of address event data. In a case where the difference between the count values is less than the second threshold value, the request signal is not to be transmitted.

When the response circuit 118 receives a response indicating the permission of the output, the selection circuit 119 outputs the count value of the time counter 113 to the horizontal readout circuit 122. The horizontal readout circuit 122 outputs the received count value as an output signal from the photoelectric conversion element 1011 to the memory 103.

Because the difference calculated by the comparator 116 corresponds to a reciprocal number of the incident frequency of photons, the photoelectric conversion element 1011 according to the present exemplary embodiment has a function of measuring a "change in the incident frequency of photons", i.e., a change in luminance. In addition, the photoelectric conversion element 1011 uses the second determination circuit 117 to output an address event in a case where the difference between the times taken for the number of incident photons to reach the first threshold value is greater than or equal to the second threshold value. In other words, the photoelectric conversion element 1011 outputs the incidence frequency in a case where the difference in the incidence frequency is greater than or equal to the second threshold value, and does not output the incidence frequency in a case where the difference is less than the second threshold value. With the above-described configuration, an asynchronous photoelectric conversion element that detects a luminance change at each pixel address in real time as an address event can be achieved.

<Variations of Photoelectric Conversion Element>

The case of using the photoelectric conversion element 1011 that uses an SPAD in the photoelectric conversion unit 111 and measures the photon incidence time to detect a change in the photon incidence frequency has been described above. However, the configuration is not limited to the configuration illustrated in FIGS. 3A and 3B as long as the photoelectric conversion element 1011 is configured to detect the luminance change as an address event in real time. For example, a photoelectric conversion element that detects a luminance change as a voltage change may be used as discussed in Japanese Patent Application Laid-Open No. 2019-134271.

<Image Generation>

The acquisition unit 201 acquires the address event signal that indicates the position of the pixel where a change in luminance has occurred and the time when the change has occurred. More specifically, the acquisition unit 201 acquires the position of the pixel where the luminance has changed in the positive or negative direction in a specific time range. The specific time range is a preset parameter and may be a minimum time width determined by the time resolution of the vertical arbitration circuit 121 of the photoelectric conversion element 1011, or a time range longer than the minimum time width may be specified by the user. With a shorter time width, an abnormal phenomenon can be detected faster. With a longer time width, the distinction between abnormal and normal phenomena can be made more accurately because the influence of errors due to random noise can be reduced.

The image generation unit 202 generates an image indicating the direction of the change in luminance in the predetermined direction, based on the address event signal. For example, by assigning a pixel value of 1 to pixels where a positive luminance change has occurred and assigning a pixel value of 0 to the other pixels, an image representing the pixels where a positive luminance change has occurred is generated. In the present exemplary embodiment, the pixel value of 1 can be replaced with any number other than 0. While in the present exemplary embodiment, a display color corresponding to the pixel value of 1 is described as "white" and a display color corresponding to the pixel value of 0 is described as "gray", the other colors may be used. While in the present exemplary embodiment, a case where the luminance change is limited to the positive luminance change is described, a similar effect can be obtained also in a case where the luminance change is limited to the negative luminance change. In a case where the luminance change is limited to the negative luminance change, in the following description, the "positive luminance change" can be replaced with the "negative luminance change" and the "negative luminance change" can be replaced with the "positive luminance change". In addition, "white" as the display color can be replaced with "black" and "black" as the display color can be replaced with "white".

The evaluation unit 204 determines, for each pixel, the evaluation value corresponding to the frequency at which the change in luminance in the predetermined direction has occurred. The evaluation value is calculated based on the frequency of positive luminance changes in the same pixel. More specifically, a timestamp difference $\Delta T$ between the address events indicating positive luminance changes is calculated and a reciprocal number $1/\Delta T$ of the timestamp difference is obtained. This is performed for each pixel having a luminance change, and the evaluation value (the frequency) for each pixel is calculated. In one embodiment, the evaluation value is to be calculated for example by taking an average of the current and previous values each time a positive luminance change occurs in order to suppress the influence of noise or the like. In the present exemplary embodiment, among the address events transmitted asynchronously from the photoelectric conversion element 1011, the address events indicating positive luminance changes are used for evaluation value calculation (described below) and the address events indicating negative luminance changes are discarded, but the evaluation value may be calculated based on the occurrence frequency of negative luminance changes.

The image generation unit 202 reorders information about the luminance changes detected by the event-based sensor into a raster scan format that is easy for the display unit 104 to display. As described above, the order of signals to be output from the photoelectric conversion element 1011 is controlled by the vertical arbitration circuit 121 in the photoelectric conversion element 1011, and the signals are output in the order of occurrence of luminance changes greater than or equal to the threshold value. Thus, unlike a synchronous photoelectric conversion element such as a general CMOS image sensor, the pixel output order is not the order of the raster scan frame format. Thus, the image generation unit 202 accumulates the signals output from the photoelectric conversion element 1011 during a specific time range in the memory 103 once, and then reorders the signals on a pixel address basis to convert the signals into the raster scan frame format. The specific time range is the reciprocal number of the refresh rate of the display unit 104 in a case where a phenomenon is to be displayed in real time. In addition, in a case where a fast changing subject is to be displayed in slow motion, the specific time range is shortened based on the speed at which the subject is to be displayed.

The display control unit 203 controls the display of the generated image based on the evaluation value. In other words, the display control unit 203 changes a pixel display method based on the evaluation value calculated for each pixel by the evaluation unit 204. For the pixel having the evaluation value smaller than a predetermined threshold value (hereinafter referred to as a display threshold value), the change in luminance in the predetermined direction is superimposed and displayed. On the other hand, for the pixel having the evaluation value greater than or equal to the display threshold value, i.e., the pixel having a high frequency of positive luminance changes, the superimposed display is canceled and is returned to default gray display (which is the same as display for pixels with no luminance change).

Figure 4A:
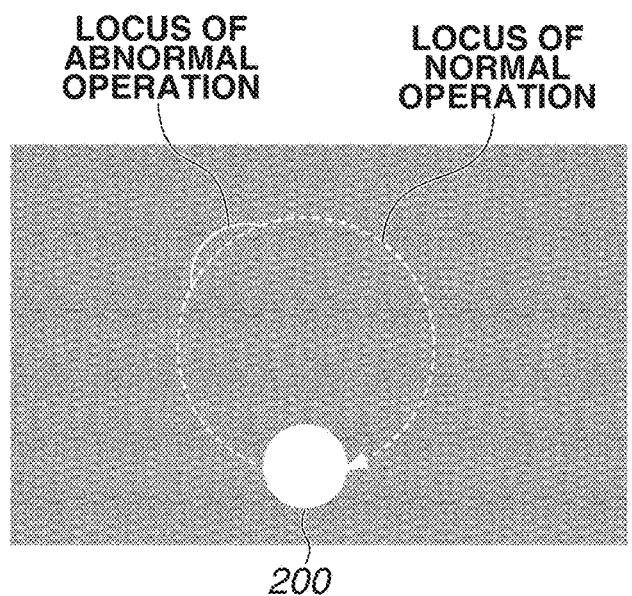
FIGS. 4A to 4C are diagrams each illustrating a display example.
Figure 4B:
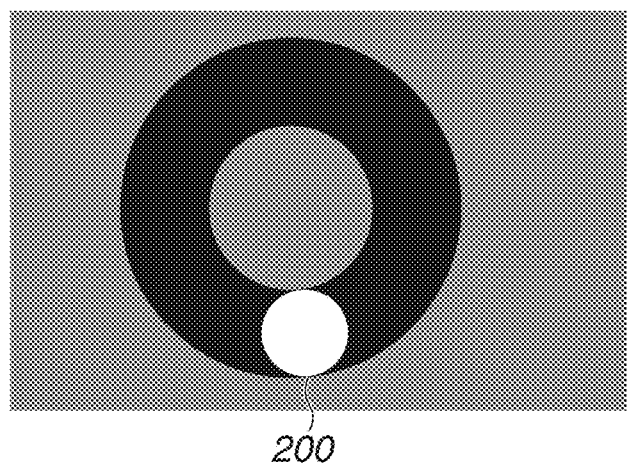
Figure 4C:
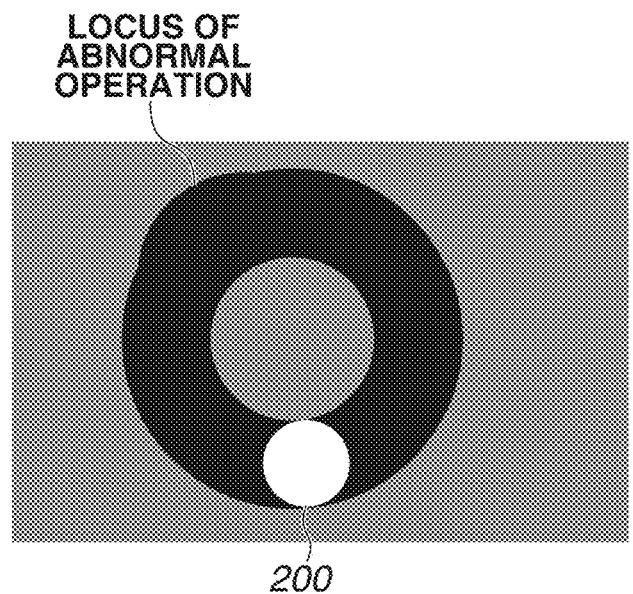
Figure 5:
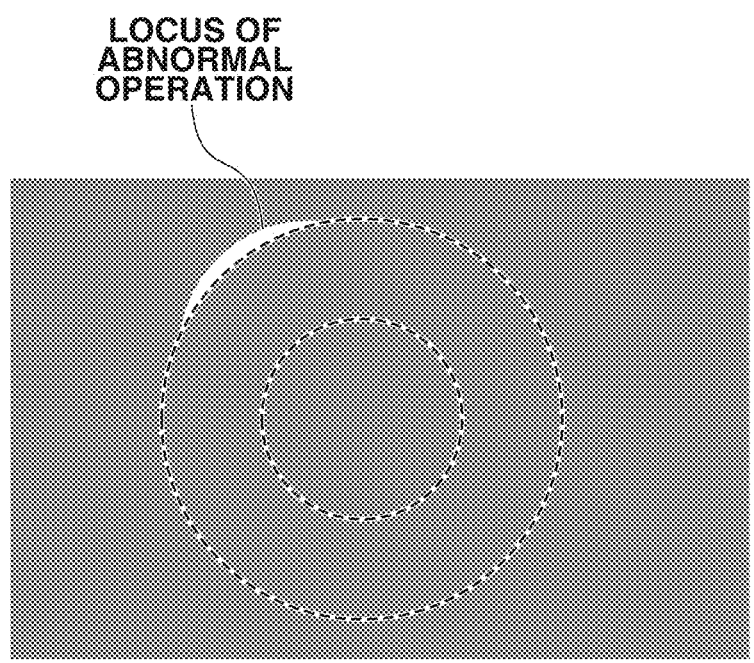
FIG. 5 is a diagram illustrating a display example according to the first exemplary embodiment.

An example of a conventional XY superimposed display will be described for comparison. FIG. 4A illustrates a subject 200 and a background. In FIG. 4A, for the sake of description, loci of the subject 200 are indicated with a white dotted line and a white solid line. In a normal operation, the subject 200 repeats a circular motion along the white dotted line, and in an abnormal operation with a low frequency, the subject 200 moves along the locus indicated by the white solid line. Also in this example, the subject 200 is higher in luminance than the background. FIGS. 4B and 4C each illustrate an example in which the subject 200 is captured by the event-based sensor and the XY superimposed display is performed. FIG. 4B illustrates a screen displayed in a case where no abnormal operation occurs and a normal operation is imaged. On the displayed screen, a black color portion indicates that a negative luminance change has been detected, a white color portion indicates that a positive luminance change has been detected, and a gray color portion indicates that no luminance change has been detected. Since the subject 200 is in circular motion, a positive luminance change occurs in an area where the subject 200 has travelled in a specific time range (e.g., a time corresponding to one frame) and the area becomes white. An area through which the subject 200 has passed is displayed in black because a negative luminance change occurs, and the display is not updated and remains as a black locus because no new luminance change occurs until the subject 200 passes through the area again. FIG. 4C illustrates an example of the XY superimposed display in a case where not only a normal operation but also an abnormal operation occurs. FIG. 4C is different from FIG. 4B in that a locus of the abnormal operation is added. As can be seen by comparing FIGS. 4B and 4C, in a case where the difference between the normal and abnormal operations is small, the difference in the locus in the XY superimposed display image is also small, which makes it difficult to distinguish between the normal and abnormal operations. FIG. 5 illustrates an example of the XY superimposed display image in a case where the display method according to the present exemplary embodiment is used. An area enclosed by dotted lines (indicated for description) in FIG. 5 indicates a normal operation locus portion and thus the display is canceled because the evaluation value (the frequency) is high and greater than or equal to the display threshold value. On the other hand, a white crescent-shaped area illustrated in FIG. 5. indicates an abnormal operation locus. The evaluation value (the occurrence frequency) of the abnormal operation portion is low and lower than the display threshold value, and thus the locus remains displayed without disappearing. Performing display as illustrated in FIG. 5 makes it easy for the user to visually observe the occurrence of an abnormality. The display of the locus of a frequent normal operation is canceled because the evaluation value exceeds the threshold value, whereas the display of the locus of an infrequent abnormal operation remains because the evaluation value does not exceed the threshold value. This makes it possible for the user to easily notice the occurrence of an abnormality.

<User Interface>

The operation unit 105 is used by the user to control the information processing apparatus 100. More specifically, the operation unit 105 has a function of switching the direction (positive direction or negative direction) of the luminance change to be displayed, changing the value of the display threshold value, changing the superimposed display start time, changing to another display method, enlarging or reducing the scale of each axis of an XY image, and the like. The operation unit 105 may also enable the user to select a part of the displayed image. In a case where a part of the displayed image is selected, the display may be changed to the XY display of the time when the locus in the selected area has occurred (which is the normal XY display, not the superimposed display). This enables the user to quickly move on to the cause analysis of an abnormality after discovering the abnormality. The display unit 104 and the operation unit 105, which have been described above, may be provided in an external apparatus connected to the information processing apparatus 100 by a network cable, wireless transmission, or the like.

<Flowchart>

Processing performed by the information processing apparatus 100 to display the address event signal as described above will be described. FIG. 9 is a flowchart illustrating the processing performed by the information processing apparatus 100. The processing illustrated in the flowchart of FIG. 9 is performed by the CPU 102, serving as a computer, according to a computer program stored in the memory 103. However, the information processing apparatus 100 may not necessarily perform all the steps illustrated in this flowchart.

In step S1001, the information processing apparatus 100 initializes various settings. For example, the time range for measuring the number of occurrences of luminance changes is set. The first threshold value is also set based on photon count noise. For example, results of luminance change measurement in a state of no moving object in a monitoring area are acquired, and the value at which the address event signal is observed is acquired. Since the address event signal observed at this time is likely to be noise, the number of occurrences of the noise is set as the first threshold value. The method for setting the first threshold value is not limited thereto. Any value may be set by the user. Next, in step S1002, the acquisition unit 201 acquires an address event signal indicating the position of a pixel where a change in luminance has occurred and the time when the change has occurred. The address event signal contains the address of the pixel where the change in luminance has occurred, the direction of the change in luminance, and time information indicating the time when the change in luminance has occurred. In step S1003, the image generation unit 202 determines whether to display an image. When sufficient data to generate an image has been gathered (e.g., address event signals have been acquired for a predetermined period of time or longer) or when an output instruction is issued by the user (YES in step S1003), the processing proceeds to step S1004 to generate an image. If address event signals have not been sufficiently gathered (NO in step S1003), the processing returns to step S1002. In step S1004, the image generation unit 202 generates an image indicating the direction of the change in luminance in the predetermined direction, based on the address event signal. In step S1005, the evaluation unit 204 determines, for each pixel, the evaluation value corresponding to the frequency at which the change in luminance in the predetermined direction has occurred. In step S1006, the display of the generated image is controlled based on the evaluation value. In step S1007, the information processing apparatus 100 determines whether to end the processing. The determination can be made based on a user's end instruction or based on whether all preset processing targets have been processed. If the information processing apparatus 100 determines to end the processing (YES in step S1007), the processing ends. If the information processing apparatus 100 determines to not end the processing (NO in step S1007), the processing returns to step S1002.

<Variations of Evaluation Value>

In the above-described example, "the frequency at which the change in luminance in the same direction occurs" is used as the evaluation value, but a method in which "if the change in luminance in the same direction occur an even number of times, the superimposed display is canceled, and if the change in luminance in the same direction occurs an odd number of times, the superimposed display is performed" may be used as an extreme example of the evaluation value. This method enables speed enhancement with reduced calculation amount.

In this method, the display of the normal operation locus is also turned on or off each time the change in luminance in the same direction occurs an even or odd number of times, and thus the display of the normal operation locus hunts (blinks). Since the occurrence frequency of the abnormal operation locus is lower than the occurrence frequency of the normal operation locus, the hunting interval of the abnormal operation locus is also longer than the hunting interval of the normal operation locus. Accordingly, the user can visually identify the abnormal operation based on the difference in the hunting interval.

Furthermore, as another example of the evaluation value, "the number of times that the change in luminance in the same direction occurs" may be used as the evaluation value. In the normal operation locus, the change in luminance in the same direction occurs every cycle, and thus the number of times of the occurrence, i.e., the evaluation value is high. On the other hand, in the abnormal operation locus, the number of times that the change in luminance in the same direction occurs is small because the abnormal operation is infrequent, and thus the evaluation value is low. In this case, similarly to the case where the frequency is used as the evaluation value, the superimposed display of the pixel for which the evaluation value is greater than or equal to the display threshold value is to be canceled. This method enables speed enhancement with reduced calculation amount, compared to the method using the frequency as the evaluation value.

<Variations of Display Method>

On the display unit 104, parameters such as the value of the display threshold value and a playback speed may be displayed in text to improve user convenience. Moreover, the evaluation value for the pixel specified by the user via the operation unit 105 may be displayed in text.

In addition, instead of canceling the superimposed display of the pixel for which the evaluation value is greater than or equal to the display threshold value, the display color thereof may be made different from the display color of the pixel for which the evaluation value is less than the display threshold value so that the user can easily notice the abnormal operation. Furthermore, the evaluation values less than the display threshold value may be grouped (e.g., divided into two equal groups) in a predetermined range, and different display colors may be used for different groups. Such display improves the possibility that the user can notice the presence of a plurality of types of abnormal operation in a case where the plurality of types of abnormal operation with different occurrence frequencies is mixed.

<Variations of How Abnormality Occurs>

The case where the occurrence frequency of abnormal operations is lower than the occurrence frequency of normal operations has been described above. Next, assuming two other patterns in which an abnormality occurs, effects on each of the patterns will be described. The first pattern is a case where a subject initially operates normally, but then starts to operate abnormally and repeats the abnormal operation. In this case, since the occurrence frequency of abnormal operations is high, the display of both the normal operation locus and the abnormal operation locus are eventually to be canceled. As a result, the user is likely to misunderstand that the subject operates completely normally because there is no abnormal operation locus left in the displayed image. In this case, a warning message such as "abnormal operation may have occurred" is to be displayed on the display unit 104 for the user at the timing when the evaluation value for each pixel changes significantly (when a change in the evaluation value is greater than a predetermined percentage). This makes it possible to determine, even if nothing is displayed in the image, whether there is actually no luminance change or whether no locus is displayed because the frequency of abnormal operations (the evaluation value) is high. In response to the user giving an instruction via the operation unit 105, the display may be changed to the XY display of the timing when the evaluation value for each pixel has changed significantly. This enables the user to promptly move on to the cause analysis of an abnormality when the abnormality occurs.

The second pattern is a case where the entire operation is normal, but a subject performs a nonperiodic operation at the initial stage of start-up and enters a periodic motion halfway. In this case, the normal initial operation is displayed in the same way as the abnormal operation locus. In this case, the user can change the timing to start the XY superimposed display via the operation unit 105 so that the XY superimposed display is started after the initial operation. Alternatively, the user can reset the XY superimposed display at the time when the subject has entered a periodic motion.

As described above, in the use case of detecting the occurrence of an abnormality in the subject that moves periodically at a high speed, the user can easily detect the occurrence of an abnormality.

<XT Display, YT Display>

In a second exemplary embodiment, unlike the first exemplary embodiment, a superimposed display (referred to as an XT superimposed display or a YT superimposed display) in a case where an XT display or a YT display is performed in a two-dimensional space with one of pixel addresses XY and a time axis T will be described. For the sake of description, a conventional display method without a superimposed display is simply referred to as an XT display or a YT display. Hereinafter, the description will be given using the XT superimposed display as an example, but the same applies to the YT superimposed display. In the case of the YT superimposed display, "X" in the following description can be replaced with "Y".

Figure 6:
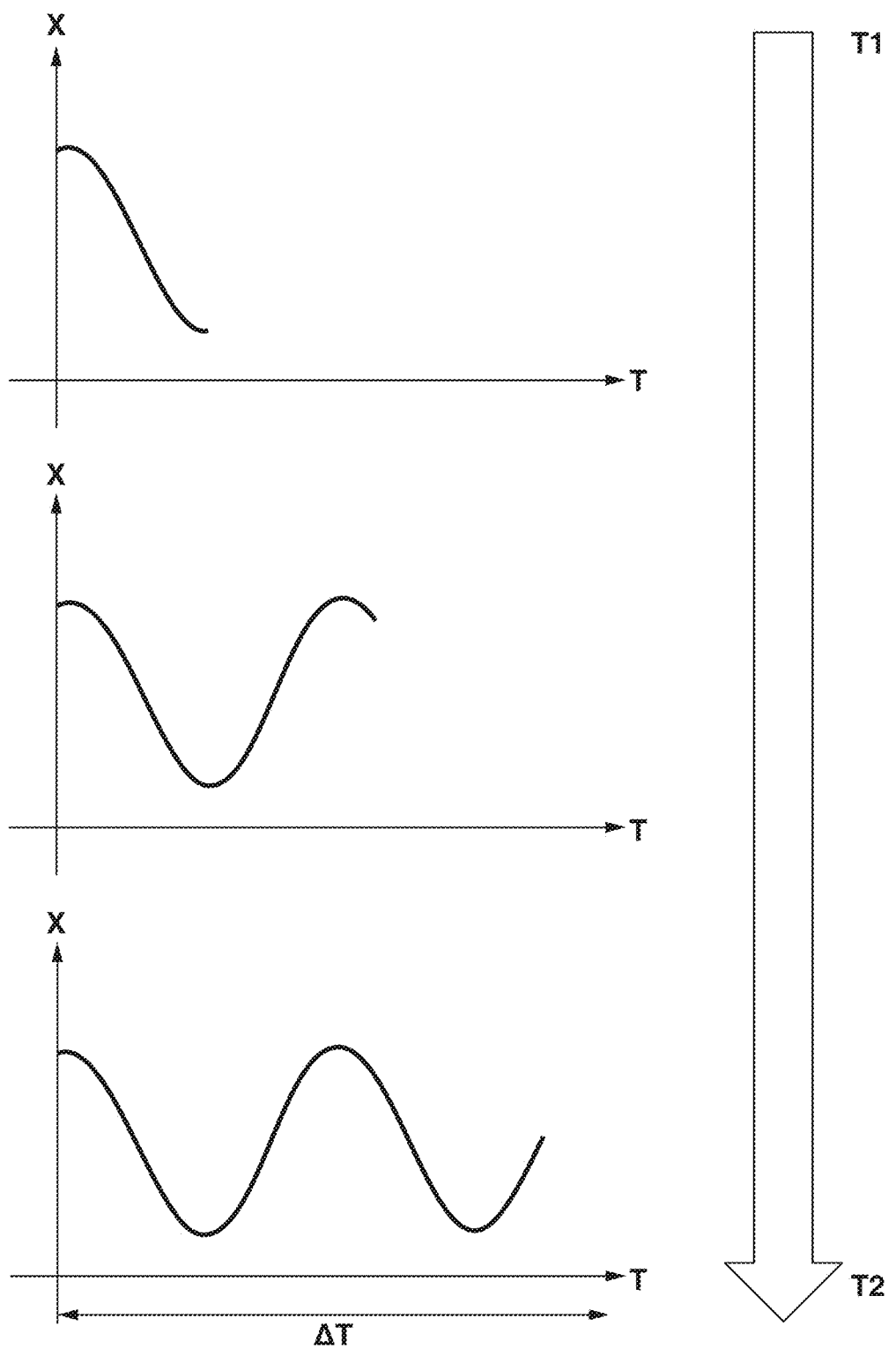
FIG. 6 is a diagram illustrating a display example.

First, the conventional XT display (which is not a superimposed display) will be described. The XT display is known as a method for displaying a change in the motion of a subject in a time direction in an easily understood manner. It is assumed here that this display method is used to analyze a case where an object in periodic motion at a constant speed causes a slowdown in an abnormal condition. FIG. 6 illustrates an example of a moving image in the conventional XT display. A subject of the image is the same as that of FIG. 4A. FIG. 6 illustrates a change in the moving image during a period from a time (past time) T1 to a time (future time) T2.

In a T axis, the left side represents the past, and newer events (X address values) are added to the right side of the T axis. A display range (a predetermined time) ΔT of the T axis is a fixed value, and after the period from the time of the oldest data to the time of the latest data exceeds the predetermined time ΔT, the data from the latest data up to the previous data acquired before the predetermined time ΔT from the time of the latest data is displayed. In other words, the past data acquired before more than the predetermined time ΔT from the time of the latest data is not to be displayed. With such a display method, if there is an abnormality (a speed change) in the periodic motion speed of the subject 200, there is a high possibility of the user missing the abnormal data.

Figure 7A:
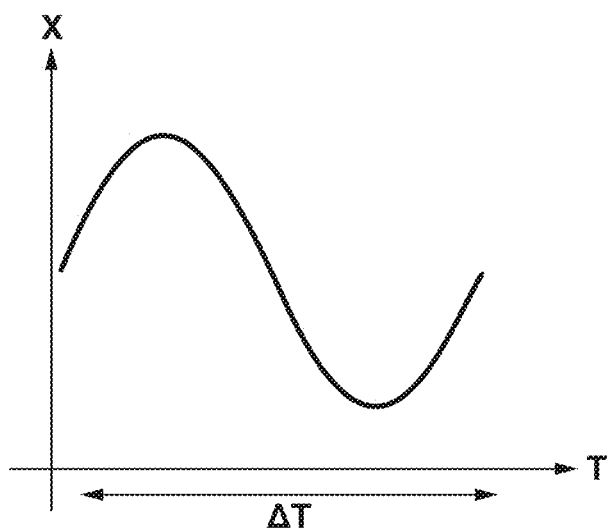
FIGS. 7A to 7C are diagrams each illustrating a display example according to a second exemplary embodiment.

Next, a case where the XT superimposed display according to the present exemplary embodiment is used will be described. FIG. 7A illustrates an example of a moving image in the XT superimposed display. A subject of the image is the same as that of FIG. 4A. Similarly to the XY superimposed display according to the first exemplary embodiment, in the XT superimposed display, positive luminance changes are superimposed and displayed and negative luminance changes are not displayed. (The same effect can be obtained also in a case where negative luminance changes are displayed.) In addition, the evaluation value (the frequency) for each pixel is calculated by the evaluation unit 204, and the superimposed display of the pixel having the evaluation value greater than or equal to the display threshold value is canceled. In other words, the image generation unit 202 generates an image indicating the position of a pixel where a change in luminance has occurred at a predetermined time interval. The display control unit 203 superimposes and displays the generated image at the predetermined time interval. The evaluation unit 204 cancels the display of the pixel (position) where the change in luminance in the same direction occur at a frequency greater than or equal to a predetermined display threshold value.

Figure 7B:
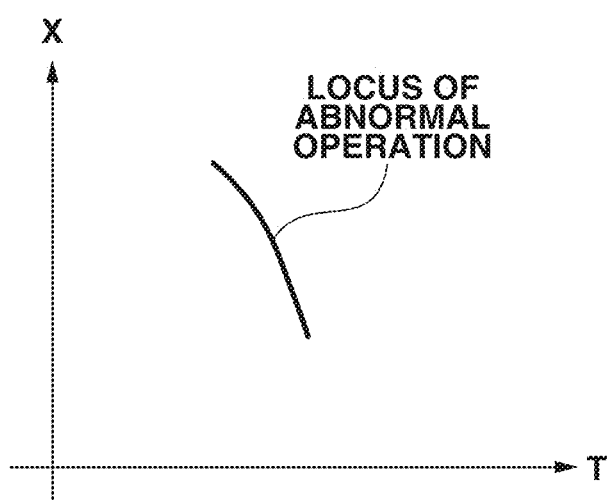

In FIG. 7A, the display is limited with a specific time width ΔT as a display range, and if the time width ΔT is exceeded from the start of image capturing, drawing is performed again starting from a time T=0. Thereafter, the drawings performed repeatedly starting from the time T=0 are superimposed and displayed in units of the time width ΔT. In the present exemplary embodiment, it is assumed that the user adjusts the time width ΔT to one cycle of the subject 200 via the operation unit 105. When the time width ΔT is set in this way, the locus of every cycle becomes overlapped, and thus the evaluation value of the normal operation locus is greater than or equal to the display threshold value, and the superimposed display is canceled. FIG. 7B illustrates an image displayed in a case where an abnormal operation (cycle) occurs. The display of the normal operation locus is canceled since the evaluation value exceeds the display threshold value, and the abnormal operation locus is displayed. By viewing the image of FIG. 7B, the user can easily notice the occurrence of an abnormal operation.

Figure 7C:
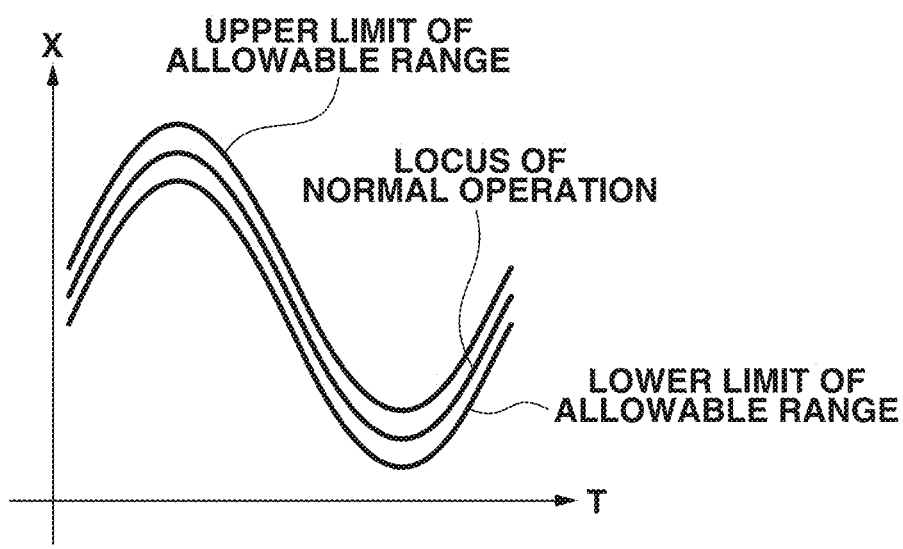

In reality, there is a certain degree of velocity fluctuation even in a normal cycle, and the loci do not overlap completely in the XT superimposed display in some cases. In such a case, it is possible to solve the issue by enabling the user to set a range where the loci can be deemed as overlapping (which is referred to a deemed overlap range) via the operation unit 105. FIG. 7C illustrates a case where the deemed overlap range is set around the actual normal operation locus. In one embodiment, the deemed overlap range is set to a value between the fluctuation width of the normal operation and the deviation width of the abnormal operation (the difference from the normal operation locus) so that the abnormal operation locus can be displayed while the influence of fluctuation is suppressed.

<XYT Display>

In a third exemplary embodiment, a method (hereinafter referred to as an XYT display) in which a luminance change detected by an address event is displayed in a three-dimensional manner with coordinates (XY) of a pixel where the event has occurred and a time (T) as axes will be described. Since the information processing apparatus according to the present exemplary embodiment is similar to the information processing apparatus 100 according to the first exemplary embodiment, only the differences will be described.

In the present exemplary embodiment, the image generation unit 202 reorders the events that have occurred during a specific time range by address and converts the events into the raster scan frame format. By repeating this conversion a plurality of times, it is possible to generate an XYT image in the form of having a plurality of frame images (XY images) in a time direction (a T direction). The display control unit 203 displays the generated XYT image three-dimensionally in the display area of a two-dimensional screen. In other words, the display control unit 203 displays the image generated by changing the time axis and the spatial axis.

The XYT display is suitable for analysis of cases where abnormalities occur in both the spatial and temporal directions because the XYT display enables the user to recognize the motion of a subject in three dimensions. The XYT display is also suitable as a method for display in cause analysis after discovery of the occurrence of an abnormality according to the first and second exemplary embodiments.

Figure 8A:
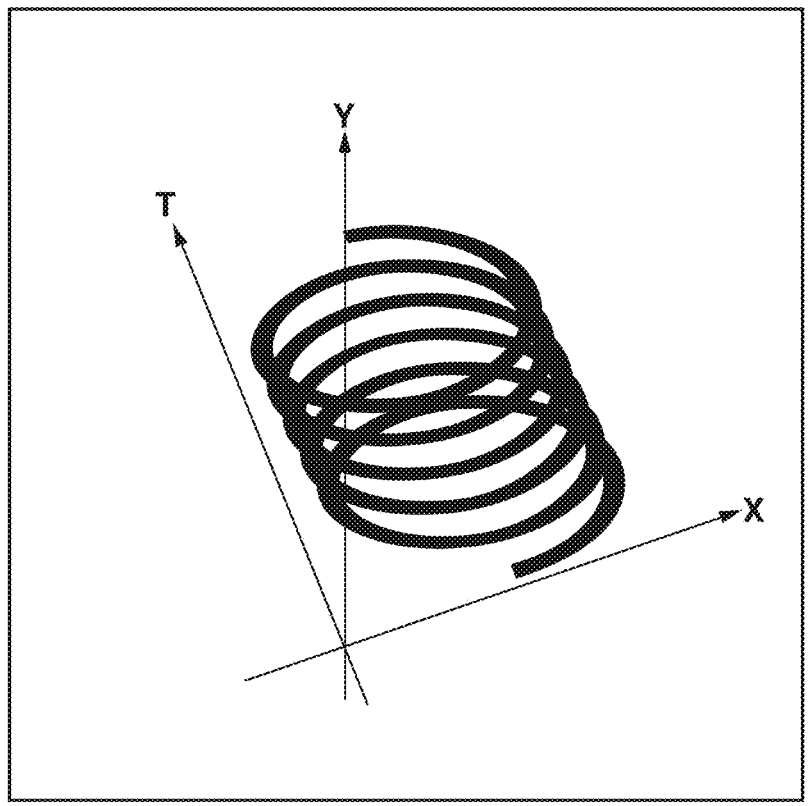
FIG. 8A is a diagram illustrating an example of a user interface.

A viewpoint setting is important in the XYT display, and if an inappropriate viewpoint is set, an image with many overlaps between address events, i.e., an image with many dead angles occurs. FIG. 8A illustrates an example of the XYT display in a case where a viewpoint where there are many dead angles is set. A subject is the same as that of FIG. 4A. In the example of FIG. 8A, it is difficult to understand the periodicity of the subject especially in the time direction, which makes it difficult for the user to detect and analyze an abnormal operation and is undesirable for the user.

In the XYT display according to the present exemplary embodiment, a viewpoint where there is a little overlap between the address events is set, so that the user can easily detect and analyze an abnormal operation. In the present exemplary embodiment, the image generation unit 202 calculates a viewpoint where the overlap between the address events is smallest. An example of the viewpoint calculation will be described. The initial viewpoint is on the T axis at an angle looking at the XYT origin, and the position on the T axis is changed so that the address events entirely fall within the display area of the display unit 104. In one embodiment, the viewpoint position on the T axis is determined so that the address events entirely fall within the display area and the data is arranged up to the proximity of one end of the display area, because count value reduction is achieved. Next, the viewpoint is rotated about the X axis by a unit angle of $2a/n$. The value n (partition number) can be any value, but a smaller value increases the time to determine the viewpoint, whereas a larger value decreases the accuracy of the optimal viewpoint. After rotating the viewpoint, the number of address events to overlap when displayed is counted and retained. Then, the rotation of the viewpoint and the calculation of the count value are repeated until the total rotation angle reaches 2a, and the viewpoint with the smallest count value is finally set. Next, the viewpoint is rotated about the Y axis by a unit angle of $2\pi r/n$, and the count value is calculated at each angle in a similar manner. After the rotation and the calculation are repeated until the total rotation angle reaches 2a, the viewpoint with the smallest count value is determined to be the optimal viewpoint and is employed.

Figure 8B:
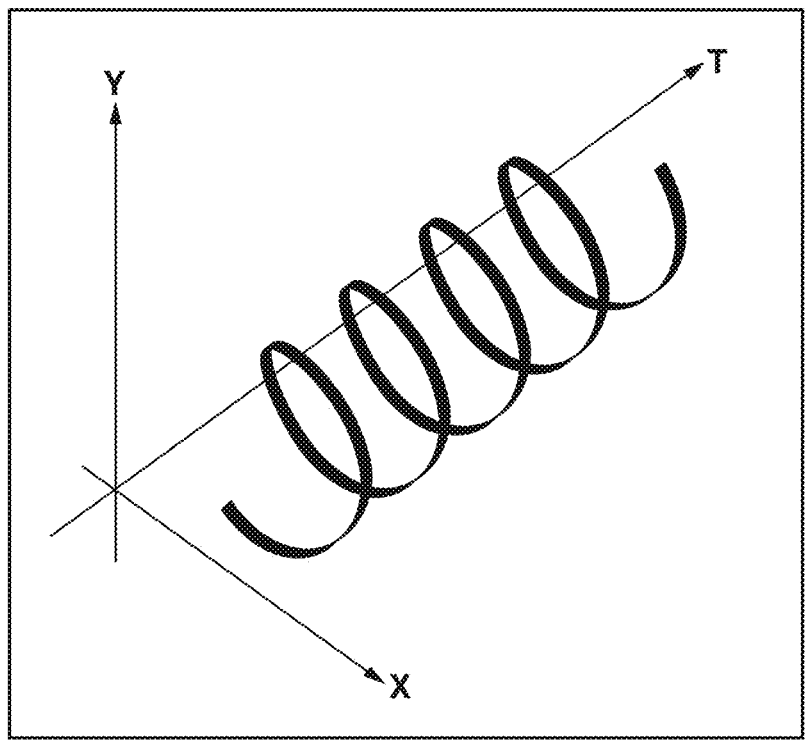
FIG. 8B is a diagram illustrating an example of a user interface according to a third exemplary embodiment

FIG. 8B illustrates an example of the XYT display that is displayed using the method according to the present exemplary embodiment. It can be seen that in FIG. 8B, there is a little overlap between the address events and an abnormal operation of the subject can be detected more easily than in FIG. 8A. As described above, the XYT display according to the present exemplary embodiment is suitable for display in analysis to be performed after the user notices the occurrence of an abnormality according to the first and second exemplary embodiments. In the first and second exemplary embodiments, if the user selects an abnormal locus via the operation unit 105, the display may be changed to the XYT display of the timing at which the abnormal locus has occurred. This enables the user to quickly move on to the cause analysis of an abnormal operation after being detected.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-201218, filed Dec. 3, 2020, which is hereby incorporated by reference herein in its entirety.

What is claimed is:

1. An apparatus comprising:
   at least one processor;
   a memory coupled to the at least one processor storing instructions that, when executed by the at least one processor, cause the processor to function as:
   an acquisition unit configured to acquire a signal that indicates a position of a pixel where a change in luminance has occurred and a time when the change in luminance has occurred;
   a determination unit configured to determine, on a pixel-by-pixel basis, an evaluation value corresponding to a frequency at which a change in luminance in a predetermined direction has occurred, based on the signal, wherein the predetermined direction includes a positive direction indicating that a luminance value of a target pixel is larger than a previous luminance value of the target pixel or a negative direction indicating that a luminance value of a target pixel is smaller than the previous luminance value of the target pixel;
   a generation unit configured to generate an image indicating a direction of the change in luminance at the position of the pixel where the change in luminance has occurred; and
   a control unit configured to control display of the generated image based on the evaluation value.

2. The apparatus according to claim 1, wherein the control unit performs control to distinguish and display a position of a pixel for which the evaluation value is greater than or equal to a predetermined threshold value and a position of a pixel for which the evaluation value is less than the predetermined threshold value.

3. The apparatus according to claim 2, wherein the control unit performs control to superimpose and display, on the generated image, an image obtained by assigning a first pixel value indicating that the change in luminance in the predetermined direction has not occurred, to the position of the pixel for which the evaluation value is greater than or equal to the predetermined threshold value, and assigning a second pixel value indicating that the change in luminance in the predetermined direction has occurred, to the position of the pixel for which the evaluation value is less than the predetermined threshold value.

4. The apparatus according to claim 2, wherein the control unit performs control to display the generated image at the position of the pixel for which the evaluation value is less than the predetermined threshold value.

5. The apparatus according to claim 1, wherein the evaluation value is a cumulative value of a number of occurrences of the change in luminance in the predetermined direction.

6. The apparatus according to claim 1, wherein the evaluation value indicates whether a number of occurrences of the change in luminance in the predetermined direction is an even number or an odd number.

7. The apparatus according to claim 1, wherein the control unit performs control to change a pixel display color based on a magnitude of the evaluation value.

8. The apparatus according to claim 1,
   wherein the generation unit generates an image indicating a position of a pixel where a change in luminance has occurred at a predetermined time interval, and
   wherein the control unit performs control to superimpose and display the generated image at the predetermined time interval in a two-dimensional space formed by an axis related to a space and an axis related to a time.

9. The apparatus according to claim 1, wherein the control unit outputs a notification about an abnormality in a case where a change in the evaluation value is greater than a predetermined percentage.

10. The apparatus according to claim 1, wherein the control unit performs control to display the generated image in a three-dimensional coordinate space formed by a T axis indicating a time axis and X- and Y-direction axes related to a space.

11. The apparatus according to claim 1, wherein the acquisition unit compares a necessary time for a number of photons to reach a predetermined value in a pixel to detect a change in luminance, and in a case where a previous measured time of the necessary time subtracted from a latest measured time of the necessary time is a threshold value or more, the acquisition unit detects the signal indicating a change in luminance in the negative direction and in a case where the latest measured time of the necessary time subtracted from the previous measured time of the necessary time is the threshold value or more, the acquisition unit detects the signal indicating a change in luminance in the positive direction.

12. A non-transitory computer-readable storage medium storing a program for causing a computer to perform a method comprising:
   acquiring a signal that indicates a position of a pixel where a change in luminance has occurred and a time when the change in luminance has occurred;
   determining, on a pixel-by-pixel basis, an evaluation value corresponding to a frequency at which a change in luminance in a predetermined direction has occurred, based on the signal, wherein the predetermined direction includes a positive direction indicating that a luminance value of a target pixel is larger than a previous luminance value of the target pixel or a negative direction indicating that a luminance value of a target pixel is smaller than the previous luminance value of the target pixel;
   generating an image indicating a direction of the change in luminance at the position of the pixel where the change in luminance has occurred; and controlling display of the generated image based on the evaluation value.

13. The non-transitory computer-readable storage medium according to claim 12, wherein the generated image is displayed so as to distinguish a position of a pixel for which the evaluation value is greater than or equal to a predetermined threshold value and a position of a pixel for which the evaluation value is less than the predetermined threshold value.

14. The non-transitory computer-readable storage medium according to claim 12,
wherein the evaluation value is a cumulative value of a number of occurrences of the change in luminance in the predetermined direction, or
wherein the evaluation value indicates whether a number of occurrences of the change in luminance in the predetermined direction is an even number or an odd number.

15. The non-transitory computer-readable storage medium according to claim 12, wherein the generating generates an image indicating a position of a pixel where a change in luminance has occurred at a predetermined time interval.

16. The non-transitory computer-readable storage medium according to claim 12, wherein the controlling outputs a notification about an abnormality in a case where a change in the evaluation value is greater than a predetermined percentage.

17. A method comprising:
acquiring a signal that indicates a position of a pixel where a change in luminance has occurred and a time when the change in luminance has occurred;
determining, on a pixel-by-pixel basis, an evaluation value corresponding to a frequency at which a change in luminance in a predetermined direction has occurred, based on the signal, wherein the predetermined direction includes a positive direction indicating that a luminance value of a target pixel is larger than a previous luminance value of the target pixel or a negative direction indicating that a luminance value of a target pixel is smaller than the previous luminance value of the target pixel;
generating an image indicating a direction of the change in luminance at the position of the pixel where the change in luminance has occurred; and
controlling display of the generated image based on the evaluation value.

18. The method according to claim 17, wherein the generated image is displayed so as to distinguish a position of a pixel for which the evaluation value is greater than or equal to a predetermined threshold value and a position of a pixel for which the evaluation value is less than the predetermined threshold value.

19. The method according to claim 17,
wherein the evaluation value is a cumulative value of a number of occurrences of the change in luminance in the predetermined direction, or
wherein the evaluation value indicates whether a number of occurrences of the change in luminance in the predetermined direction is an even number or an odd number.

20. The method according to claim 17, wherein the generating generates an image indicating a position of a pixel where a change in luminance has occurred at a predetermined time interval.

21. The method according to claim 17, wherein the controlling outputs a notification about an abnormality in a case where a change in the evaluation value is greater than a predetermined percentage.

* * * * *